United States Patent
Tatsu et al.

[11] Patent Number: 5,874,506
[45] Date of Patent: Feb. 23, 1999

[54] FLUORINE-CONTAINING ELASTOMER COMPOSITION

[75] Inventors: Haruyoshi Tatsu, Hitachi; Akihiro Naraki, Kitaibaraki; Yuichi Yamamoto, Takahagi, all of Japan

[73] Assignee: Nippon Mektron, Limited, Tokyo, Japan

[21] Appl. No.: 834,521

[22] Filed: Apr. 4, 1997

[30] Foreign Application Priority Data

Jul. 24, 1996 [JP] Japan .................................. 8-213216

[51] Int. Cl.$^6$ ....................................... C08F 8/30
[52] U.S. Cl. ..................... 525/340; 525/326.3; 525/374; 525/378; 525/379; 526/253
[58] Field of Search .................... 525/340, 374, 525/378, 379; 526/253

[56] References Cited

U.S. PATENT DOCUMENTS

| | | | |
|---|---|---|---|
| 3,884,877 | 5/1975 | Kolb | 525/326.3 |
| 3,931,121 | 1/1976 | Davis et al. | 525/326.3 |
| 3,960,822 | 6/1976 | Davis et al. | 525/326.3 |
| 4,287,320 | 9/1981 | Kolb | 525/326.3 |
| 4,506,054 | 3/1985 | Vasta | 525/326.3 |

FOREIGN PATENT DOCUMENTS 8-12840  1/1996  Japan .

*Primary Examiner*—Bernard Lipman
*Attorney, Agent, or Firm*—Kenyon & Kenyon

[57] ABSTRACT

A fluorine-containing elastomer comprising vinylidene fluoride, tetrafluoroethylene and hexafluoropropylene having a high fluorine content (e.g. at least 68% by weight) can be vulcanized with a polyol-based cross-linking agent by further copolymerizing 2H-pentafluoropropylene into the elastomer, whereby the resulting vulcanization products having improved characteristics such as rheological properties, normal state physical properties and compression set can be obtained. Vulcanization products obtained by vulcanization with a polyol-based cross-linking agent and a quaternary onium salt compound have a good permeation resistance to fuel oil as a result of a permeation test with a mixed solvent of gasoline/methanol in a volume ratio of 85/15.

11 Claims, No Drawings

FLUORINE-CONTAINING ELASTOMER COMPOSITION

BACKGROUND OF THE INVENTION

1. Field of the Invention

The present invention relates to a fluorine-containing elastomer composition, and more particularly to a fluorine-containing elastomer composition capable of giving vulcanization products having a distinguished permeation resistance to fuel oil.

2. Related Prior Art

JP-A-8-12840 discloses a fluorine-containing elastomer composition having a good processability and for use as vulcanization molding materials for fuel hoses, injector O-rings, etc. The fluorine-containing elastomer composition comprises, as essential components, a fluorine-containing elastomer being a vinylidene fluoride-based copolymer or terpolymer containing at least 67% by weight of fluorine and comprising 30 to 50% by weight of vinylidene fluoride and 20 to 60% by weight of hexafluoropropylene, and an adduct of a polyhydroxy or polythiol compound curing agent and a quater-nary phosphonium salt compound promoter in a ratio of the curing agent to the promoter of 2 to 5 by mole.

It is further recommended that an aminophosphonium compound is preferable as a quaternary phosphonium salt compound as a promoter component. However, such an amino-phosphonium compound is very hard to obtain and also very expensive, giving a serious obstacle to the industrial utilization. Furthermore, it is not desirable to use an amine compound having a carcinogenic fear, and there is also a fear of generation of unpreferable nitroso compounds from the amine compound when used in the heat vulcanization.

It is known that a fluorine-containing elastomer having a high fluorine content generally has low in the gasoline permeability, and thus it is a highly desirable material in light of total discharge control of gasoline from automobiles (Carifornia SHED regulations, USA). Above all, a fluorine-containing elastomer having a fluorine content of 68% by weight, has a good balance between the permeation resistance to gasoline and the low temperature resistance. However, when a vinylidene fluoride-based copolymer or terpolymer containing vinylidene fluoride (VdF) and hexafluoropropylene (HFP) is cross-linked with a polyhydroxy compound, its cross-linking mechanism seems to be an addition reaction of phenolate anions onto the double bonds formed by dehydrofluorination reaction of VdF-HFP chains. The VdF-HFP-based copolymer or terpolymer having a high fluorine content has less VdF-HFP chains, and thus the cross-linking reaction by a polyhydroxy compound proceeds very slowly. Such tendency is remarkable particularly in case of fluorine-containing elastomer having a fluorine content of 68% by weight or more. Slow cross-linking reaction will lower a cross-linking density, further resulting in decrease in physical properties such as compression set, etc.

SUMMARY OF THE INVENTION

An object of the present invention is to provide a fluorine-containing elastomer composition capable of giving vulcanization products having a distinguished permeation resistance to fuel oil and also improved characteristics such as compression set, etc., when cross-linked with a polyhydroxy compound (polyol-based) cross-linking agent, the composition comprising a vinylidene fluoride-hexafluoropropylene-based copolymer having a high fluorine content.

A fluorine-containing elastomer composition according to the present invention, comprises a fluorine-containing elastomer having a fluorine content of at least 68% by weight, the elastomer being a quaternary copolymer comprising vinylidene fluoride, tetrafluoroethylene, hexafluoropropylene and 2H-pentafluoropropylene; a polyol-based cross-linking agent; and a quaternary onium salt compound.

DETAILED DESCRIPTION OF THE INVENTION

A copolymer comprising vinylidene fluoride (VdF), tetrafluoroethylene (TFE), hexafluoropropylene (HFP) and 2H-penta-fluoropropylene (PFP) for use in the present invention is a novel copolymer, and comprises about 35 to about 65% by mole, preferably about 40 to about 60% by mole, of vinylidene fluoride, about 10 to about 30% by mole, preferably about 15 to about 30% by mole, of tetrafluoroethylene, about 16 to about 30% by mole, preferably about 16 to about 25% by mole, of hexafluoropropylene, and about 0.5 to about 5% by mole, preferably about 1 to about 3% by mole, of 2H-pentafluoropropylene, the sum total being 100% by mole, and has a fluorine content of at least 68% by weight, preferably 68 to 71% by weight and a $\eta sp/c$ value (as measured as a 1 wt. % solution in methyl ethyl ketone at 35° C.) of at least 0.5, preferably 0.6 to 1.5.

When 2H-pentafluoropropylene, which is characteristics of the quaternary copolymer for use in the present elastomer, is less than about 0.5% by mole, no substantial improvement of vulcanization rate is observable, resulting in a failure to improve such characteristics as rheological properties, normal state physical properties and compression set, whereas above about 5% by mole, deterioration of low temperature resistance is considerable and a higher proportion is not preferrable from viewpoint of cost.

The quaternary copolymer can further contain an olefin compound such as ethylene, propylene, isobutylene, etc., or a vinyl compound such as methyl vinyl ether, ethyl vinyl ether, butyl vinyl ether, methyl allyl ether, vinyl acetate, vinyl propionate, perfluoro(methyl vinyl ether), perfluoro (propyl vinyl ether), perfluoro(alkoxyalkyl vinyl ether), etc. to such an extent as not to deteriorate the characteristics of the quaternary copolymer (e.g. not more than about 5% by mole on the basis of the copolymer).

Copolymerization can be carried out by any polymerization method, for example, by emulsion polymerization, suspension polymerization, solution polymerization, bulk polymerization, etc. Above all, the emulsion polymerization is preferable from viewpoints of a higher polymerization degree and economy, and is generally carried out at a temperature of about 0° to 80° C., preferably about 0° to 60° C. under a pressure of about 0 to 20 kg /cm$^2$ gauge, preferably about 0 to 10 kg/cm$_2$ gauge, using a water-soluble inorganic peroxide such as ammonium persulfate, etc. or a redox system thereof with a reducing agent as a catalyst and ammonium perfluorooctanoate, ammonium perfluoroheptanoate, ammonium perfluorononanoate, etc. or a mixture thereof, preferably ammonium perfluorooctanoate as an emulsifier, where an electrolyte compound having a buffer action, such as Na$_2$HPO$_4$, NaH$_2$ PO$_4$, KH$_2$ PO$_4$, etc. or NaOH, etc. may be added thereto to adjust pH of the polymerization system.

The resulting quaternary copolymer is vulcanized by a polyol-based cross-linking agent and a quaternary onium salt.

Polyol-based cross-linking agent for use in the present invention includes, for example, a polyhydroxy aromatic compound such as 2,2-bis(4-hydroxyphenyl)propane [bisphenol A], 2,2-bis(4-hydroxyphenyl)perfluoropropane [bisphenol AF], hydro-quinone, catechol, resorcinol, 4,4'-dihydroxydiphenyl, 4, 4'-dihydroxydiphenylmethane, 4,4'-dihydroxydiphenylsulfone, 2,2-bis(4-hydroxyphenyl) butane, etc. or their alkali metal salts or alkaline earth metal salts. About 0.5 to about 10 parts by weight, preferably about 1 to about 5 parts by weight, of the cross-linking agent can be used per 100 parts by weight of the fluorine-containing elastomer.

As a quaternary onium salt, about 0.1 to about 30 parts by weight, preferably about 0.2 to about 20 parts by weight, of at least one of ammonium salts or phosphonium salts represented by the following general formulae can be used per 100 parts by weight of the fluorine-containing elastomer. Below about 0.1 parts by weight vulcanization products having desired physical properties cannot be obtained, whereas above about 30 parts by weight the resulting vulcanization products turn unpractical because of its lower stretchability:

where $R_1$ to $R_4$ are an alkyl group, an alkoxy group, an aryl group, an alkylaryl group, an aralkyl group or a polyoxyalkylene group, each having 1 to 25 carbon atoms, or two or three of $R_1$ to $R_4$ may form a heterocyclic structure together with P or N; and $X^-$ is an anion such as $Cl^-$, $Br^-$, $I^-$, $HSO_4^-$, $H_2PO_4^-$, $H_2BO_4^-$, $RCOO^-$, $ROSO_2^-$, $RSO^-$, $ROPO_2 H^-$, $CO_3^{--}$, $BF_4^-$, etc., where R is an alkyl group or an aryl group.

Specifically, the quaternary ammonium salt for use in the present invention includes, for example, tetraethylammonium bromide, tetrabutylammonium chloride, tetrabutylammonium bromide, tetrabutylammonium iodide, n-dodecyltrimethylammonium bromide, cetyldimethylbenzylammonium chloride, methylcetyl-dibenzylammonium bromide, cetyldimethylethylammonium bromide, octadecyltrimethylammonium bromide, cetylpyridinium chloride, cetylpyridinium bromide, cetylpyridinium iodide, cetylpyridinium sulfate, 1-benzylpyridinium chloride, 1-benzyl-3, 5-dimethylpyridinium chloride, 1-benzyl-4-phenylpyridinium chloride, 1,4-dibenzylpyridinium chloride, 1-benzyl-4-(pyrrolidinyl)pyridinium chloride, 1-benzyl-4-pyridinopyridinium chloride, tetraethylammonium acetate, trimethyl-benzylammonium benzoate, trimethylbenzylammonium-p-toluene-sulfonate, trimethylbenzylammonium borate, 8-benzyl-1,8-diazabicyclo [5,4,0]-undec-7-enium chloride, 1,8-diazabicyclo[5, 4,0]-undecene-7-methylammonium methosulfate, 5-benzyl-1,5-diazabicyclo [4,3,0]-5-nonenium chloride, 5-benzyl-1,5-diaza-bicyclo [4,3,0]-5-nonenium bromide, 5-benzyl-1,5-diazabicyclo[4,3,0]-5-nonenium tetrafluoroborate, 5-benzyl-1,5-diaza-bicyclo [4,3,0]-5-nonenium hexafluorophosphate, etc.

The quaternary phosphonium salt for use in the present invention includes, for example, tetraphenylphosphonium chloride, triphenylbenzylphosphonium chloride, triphenylbenzylphosphonium bromide, triphenylmethoxymethylphosphonium chloride, triphenylmethylcarbonylmethylphosphonium chloride, triphenylethoxycarbonylmethylphosphonium chloride, trioctylbenzylphosphonium chloride, trioctylmethylphosphonium bromide, trioctylethylphosphonium acetate, trioctylethylphosphonium dimethylphosphate, tetraethylphosphonium chloride, tetrapropylphosphonium chloride, tetrabutylphosphonium chloride, tetraoctylphosphonium chloride, tetrabenzylphosphonium chloride, cetyldimethylbenzylphosphonium chloride, etc.

Furthermore, as a polyol-based cross-linking agent, a quaternary phosphonium salt or both, a bisphenol compound represented by the following general formula can be used:

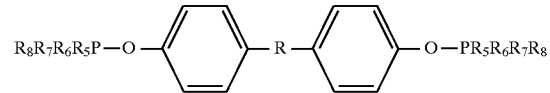

where R is an alkylene group having 1 to 5 carbon atoms, a perfluoroalkylene group having 1 to 5 carbon atoms, a $SO_2$ group or an C group; and $R_5$, $R_6$, $R_7$, and $R_8$ are the same or different alkyl groups, alkenyl groups, aryl groups, alkylaryl groups or aralkyl groups, each having 1 to 25 carbon atoms.

The bisphenol compound can be readily obtained by reaction of one parts by mole of a bisphenol compound represented by the following general formula:

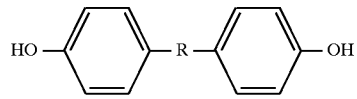

with 2 parts by mole of a quaternary phosphonium halide represented by the following general formula:

where $R_5$, $R_6$, $R_7$ and $R_8$ have the same meanings as defined above; and X is Cl or Br.

The quaternary phosphonium salt represented by the general formula $PR_5 R_6 R_7 R_8 X$ includes, for example, tetraphenyl-phosphonium chloride, triphenylbenzylphosphonium chloride, triphenylbenzylphosphonium bromide, triphenylmethoxymethylphosphonium chloride, triphenylmethylcarbonylmethylphosphonium chloride, triphenylethoxycarbonylmethylphosphonium chloride, trioctylbenzylphosphonium chloride, trioctylmethylphosphonium bromide, trioctylethylphosphonium acetate, trioctylethylphosphonium dimethylphosphate, tetraethylphosphonium chloride, tetrapropylphosphonium chloride, tetrabutylphosphonium chloride, tetraoctylphosphonium chloride, tetrabenzylphosphonium chloride, tetravinylphosphonium chloride, tetraallylphosphonium chloride, cetyldimethylbenzylphosphonium chloride, etc.

The foregoing components for the vulcanization system can be blended and kneaded with the fluorine-containing elastomer directly or after dilution with carbon black, silica, clay, talc, diatomaceous earth, barium sulfate, etc. or used as a master batch dispersion with the fluorine-containing elastomer. The present composition can further contain a well known filler or reinforcing agent (e.g. carbon black, silica, graphite, clay, talc, diatomaceous earth, barium sulfate, titanium oxide, wollastonite, etc.), a plasticizer, a lubricant, a processing aid, a pigment, etc. appropriately besides the above-mentioned components.

Vulcanization can be carried by heating after blending the fluorine-containing elastomer with the above-mentioned components by the ordinary mixing method, for example, by roll mixing, kneader mixing, Bambury mixing, solution mixing, etc. Vulcanization is generally carried out at a temperature of about 100° to about 250° C. for about 1 to about 120 minutes for primary vulcanization and at a temperature of about 150° to about 300° C. for 0 to 30 hours for secondary vulcanization. Furthermore, vulcanization may be carried out by injection molding.

According to the present invention, a fluorine-containing elastomer comprising vinylydene fluoride, tetrafluoroethylene and hexafluoropropylene having a high fluorine content can be vulcanized with a polyol-based cross-linking agent by further copolymerizing 2H-pentafluoropropylene into the elastomer, and vulcanization products having improved characteristics such as rheological properties, normal state physical properties and compression set can be obtained thereby.

The vulcanization products have a distinguished permeation resistance to fuel oil as a result of a permeation test with a mixed solvent of gasoline / methanol (in volume ratio of 85:15), and thus are effectively used as materials for fuel hoses, shaft seals, injector O-rings, etc.

PREFERRED EMBODIMENTS OF THE INVENTION

The present invention will be described in detail below, referring to Examples and Comparative Examples.

EXAMPLE 1

Into an autoclave having a capacity of 11.2 liters, provided with a stirrer were charged the following compounds:

| | |
|---|---|
| Perfluorooctanoic acid | 2.2 g |
| Sodium hydroxide | 2.1 g |
| Sodium sulfite | 2.0 g |
| Purified water | 5.9 liters |

Pressurization by a nitrogen gas and evacuation were repeated to remove oxygen from the autoclave. Then, the autoclave was subjected to pressure reduction, and then 3.3 g of isopropanol and the following monomers were charged into the autoclave as an initial charge and the autoclave was kept at 80° C.:

| | |
|---|---|
| VdF/TFE mixed gas (in a molar ratio of 75.5/24.5) | 190 g |
| HFP | 300 g |
| PFP | 120 g |

Then, an aqueous solution containing 5.9 g of ammonium persulfate in 100 ml of purified water was charged into the autoclave under pressure.

The above-mentioned VdF/TFE mixed gas was further charged into the autoclave in that state by a compressor until the autoclave pressure reached to 30 kg/cm$^2$ gauge, and then HFP was further charged therein under pressure in such an amount as to make the HFP amount of 48.56% by weight on the basis of the further charged mixed gas. The further charging needed 80 minutes, whereby the total charged mixed gas amounted to 1,770 g and the total charged HFP amounted to 860 g. During the further charging, the autoclave was kept under a pressure of 29 to 30 kg/cm$^2$ gauge. At 30 minutes after the further charging, the inside pressure of the autoclave was decreased to about 12 kg/cm$^2$ gauge, and unreacted monomers and 8.9 kg of latex (solid content: 31.2 wt. %) were recovered from the autoclave at that time. The recovered latex was slowly added to an aqueous 10 wt. % sodium chloride solution at 70° C. to coagulate the formed polymer, followed by washing with water and drying, whereby about 2.7 kg of copolymer was obtained.

The thus obtained copolymer had a ηsp/c value of 0.92 as measured as a 1.0 wt. % solution in methyl ethyl ketone at 35° C. and a copolymer composition of 21.2 mol. % TFE, 61.4 mol.% VdF, 16.2 mol. % HFP and 1.2 mol. % PFP, as measured by $^{19}$F-NMR, except for HFP and PFP percentages, which were derived from amounts of unreacted monomers in the remaining gas determined by chromatography, respectively. Fluorine content calculated from the copolymer composition was 68.4% by weight.

EXAMPLE 2

In Example 1, polymerization reaction was carried out by changing the initially charged amounts of HFP and PFP to 200 g, respectively, and the amount of ammonium persulfate to 7.5 g, whereby 2.5 kg of copolymer was obtained. The copolymer had a ηsp/c value of 0.81 and a copolymer composition of 22.4 mol.7% TFE, 59.6 mol. % VdF, 16.1 mol. % HFP and 1.9 mol. % PFP. Fluorine content calculated from the copolymer composition was 68.6% by weight.

Comparative Example 1

In Example 1, polymerization was carried out by changing the amount of HFP to 400 g without using PFP as the initial charge, whereby a copolymer having a ηsp/c value of 0.90 and a copolymer composition of 21.0 mol. % TFE, 61.6 mol. % VdF and 17.4 mol. % HFP was obtained.

EXAMPLE 3

100 parts by weight of the respective copolymers obtained in Example 1 to 2 and Comparative Example 1 were added the following compounds:

| | Parts by weight |
|---|---|
| Bisphenol AF | 2 |
| MT carbon black | 20 |
| Calcium hydroxide | 6 |
| Magnesium oxide | 3 |
| Benzyltriphenylphosphonium chloride | 0.4 |

The resulting mixture was kneaded through an open roll, and the kneaded mixture was subjected to press vulcanization (primary vulcanization) at 180° C. for 10 minutes and then to oven vulcanization (secondary vulcanization) at 230° C. for 24 hours.

Rheological properties (according to ASTM D1646-74) and ODR-100 at 180° C. for evaluating the vulcanization rate (according to ASTM D2084-81) during the vulcanization, and physical properties (according to ASTM D412-83) and compression set (according to DIN 53517) of the vulcanization products were measured and the results are shown in the following Table 1.

TABLE 1

| | No.1 | No. 2 | No. 3 |
|---|---|---|---|
| [Copolymer] | Ex. 1 | Ex. 2 | Com. Ex. 1 |
| [Rheological properties] | | | |
| Mooney viscosity at 125° C. (ML$_{1+4}$) | 55 | 48 | 51 |
| Mooney scorch at 125° C. (minimum viscosity) | 53 | 45 | 48 |
| Time required for viscosity increase by 5 points (min.) | 23 | 19 | 29 |
| [ODR 100 at 180° C.] | | | |
| ML (kg · cm) | 8.3 | 7.9 | 8.3 |
| MH (kg · cm) | 60 | 55 | 53 |

TABLE 1-continued

|  | No.1 | No. 2 | No. 3 |
|---|---|---|---|
| $Tc_{10}$ (min.) | 1.3 | 0.9 | 2.2 |
| $Tc_{90}$ (min.) | 2.2 | 1.9 | 2.9 |
| [Normal state physical properties] | | | |
| Shore A hardness | 69 | 68 | 67 |
| 100% modulus (MPa) | 5.2 | 5.5 | 4.4 |
| Tensile strength (MPa) | 16.5 | 15.8 | 14.3 |
| Elongation at breakage (%) | 230 | 200 | 220 |
| [Compression set] | | | |
| 200° C. for 70 hours (%) | 20 | 19 | 22 |

The coplymer obtained in Example 1 was vulcanization molded into a disc sheet, having 20 mm in diameter and 2 mm thick, according to the above-mentioned blending formulation and under the above-mentioned vulcanization conditions, and disc sheet was used as a top cover on an opening, having 10 mm in diameter, of a stainless steel container (net volume: 5 ml). A mixed solvent of gasoline / methanol (in a volume ratio of 85/15) was placed into the container and the container was left standing in an atmosphere at 25° C. A difference in weight of the total container at the 3rd day and the 7th day was measured. Amount of the permeated mixed solvent through the top cover, as measured above, was 14.5 mg, which corresponded to a permeation rate of 13.2 g.mm/m² day.

EXAMPLE 4

Into an autoclave having a capacity of 11.2 liters, provided with a stirrer were charged the following compounds:

| Perfluorooctanoic acid | 6.6 g |
| Sodium dihydrogen phosphate | 1.6 g |
| Purified water | 4.9 liters |

Pressurization by a nitrogen gas and evacuation were repeated to remove oxygen from the autoclave. Then, the autoclave was subjected to pressure reduction, and then 3.3 g of isopropanol and the following monomers were charged into the autoclave as an initial charge and the autoclave was kept at 75° C.:

| VdF/TFE mixed gas | 270 g |
| (in a molar ratio of 71.0/29.0) | |
| HFP | 600 g |
| PFP | 250 g |

Then, an aqueous solution containing 5.9 g of ammonium persulfate in 100 ml of purified water was charged into the autoclave under pressure.

The above-mentioned VdF/TFE mixed gas was further charged into the autoclave in that state by a compressor until the autoclave pressure reached to 24 kg/cm² gauge, and then HFP was further charged therein under pressure in such an amount as to make the HFP amount of 1.42% by weight on the basis of the further charged mixed gas. The further charging needed 180 minutes, whereby the total charged mixed gas amounted to 660 g and the total charged HFP amounted to 850 g. During the further charging, the autoclave was kept under a pressure of 23 to 24 kg/cm² gauge. At 30 minutes after the further charging, the inside pressure of the autoclave was decreased to about 16 kg/cm² gauge, and unreacted monomers and 6.2 kg of latex (solid content: 20.5 wt. %) were recovered from the autoclave at that time. The recovered latex was slowly added to an aqueous 10 wt. % sodium chloride solution at 70° C. to coagulate the formed polymer, followed by washing with water and drying, whereby about 1.25 kg of copolymer was obtained. The thus obtained copolymer had a ηsp/c value of 0.82 as measured as a 1.0 wt. % solution in methyl ethyl ketone at 35° C. and a copolymer composition of 22.3 mol. % TFE, 53.0 mol. % VdF, 22.1 mol. % HFP and 2.6 mol. % PFP, as measured by [19] F-NMR except for HFP and PFP percentages, which were derived from amounts of unreacted monomers in the remaining gas determined by chromatography, respectively. Fluorine content calculated from the copolymer composition was 69.8% by weight.

Comparative Example 2

In Example 4, polymerization reaction was carried out by changing the amounts of HFP to 830 g without using PFP as the initial charge, whereby a copolymer having a ηsp/c value of 0.84 and a copolymer composition of 21.8 mol. % TFE, 53.5 mol. % VdF and 24.7 mol. % HFP was obtained.

Comparative Example 3

Evaluation of copolymers of Example 4 and Comparative Example 2 and the resulting vulcanization products were carried out in the same manner as in Example 3, and the results are shown in the following Table 2.

TABLE 2

|  | No. 4 | No. 5 |
|---|---|---|
| [Copolymer] | Ex. 4 | Com. Ex. 2 |
| [ODR 100 at 180° C.] | | |
| ML (kg · cm) | 8.1 | 7.9 |
| MH (kg · cm) | 53 | 46 |
| $Tc_{10}$ (min.) | 43 | 12.3 |
| $Tc_{90}$ (min.) | 75 | 25.9 |
| [Normal state physical properties] | | |
| Shore A hardness | 67 | 62 |
| 100% modulus (MPa) | 4.6 | 3.7 |
| Tensile strength (MPa) | 15.1 | 12.6 |
| Elongation at breakage (%) | 260 | 340 |
| [Compression set] | | |
| 200° C. for 70 hours (%) | 24 | 39 |

What is claimed is:

1. A fluorine-containing elastomer composition, which comprises a fluorine-containing elastomer having a fluorine content of at least 68% by weight, the elastomer being a quaternary copolymer comprising vinylidene fluoride, tetrafluoroethylene, hexafluoropropylene and 2H-pentafluoro-propylene; a polyol-based cross-linking agent; and a quaternary onium salt compound.

2. A fluorine-containing elastomer composition according to claim 1, wherein the fluorine-containing elastomer comprises 35 to 65% by mole of vinylidene fluoride, 10 to 30% by mole of tetrafluoroethylene, 16 to 30% by mole of hexafluoropropylene and 0.5 to 5% by mole of 2H-pentafluoropropylene, the sum total being 100% by mole.

3. A fluorine-containing elastomer composition according to claim 1, wherein the polyol-based cross-linking agent is a polyhydroxy aromatic compound, its alkali metal salt or alkaline earth metal salt.

4. A fluorine-containing elastomer composition according to claim 1, wherein the polyol-based cross-linking agent is used in an amount of about 0.5 to about 10 parts by weight per 100 parts by weight of the fluorine-containing elastomer.

5. A fluorine-containing elastomer composition according to claim 1, wherein the quaternary onium salt is a quaternary ammonium salt represented by the following general formula:

where $R_1$ to $R_4$ are an alkyl group, an alkoxy group, an aryl group, an alkylaryl group, an aralkyl group or a polyoxyalkylene group, each having 1 to 25 carbon atoms, or two or three of $R_1$ to $R_4$ may form a heterocyclic structure together with N; and $X^-$ is an anion.

6. A fluorine-containing elastomer composition according to claim 1, wherein the quaternary onium salt is a quaternary phosphonium salt represented by the following general formula:

where $R_1$ to $R_4$ are an alkyl group, an alkoxy group, an aryl group, an alkylaryl group, an aralkyl group or a polyoxyalkylene group, each having 1 to 25 carbon atoms, or two or three of $R_1$ to $R_4$ may form a heterocyclic structure together with P; and $X^-$ is an anion.

7. A fluorine-containing elastomer composition according to claim 1, wherein the quaternary onium compound is used in an amount of about 0.1 to about 30 parts by weight per 100 parts by weight of the fluorine-containing elastomer.

8. A fluorine-containing elastomer composition according to claim 5, wherein a bisphenol compound represented by the following general formula is used as the polyol-based cross-linking agent and/or the quaternary phosphonium salt:

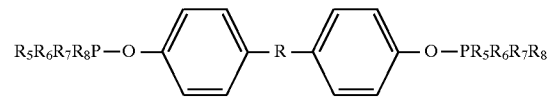

where R is an alkylene group having 1 to 5 carbon atoms, a perfluoroalkylene group having 1 to 5 carbon atoms, a $SO_2$ group or an O group; and $R_5$, $R_6$, $R_7$ and $R_8$ are the same or different alkyl groups, alkenyl groups, aryl groups, alkylaryl groups or aralkyl groups, each having 1 to 25 carbon atoms.

9. A fluorine-containing elastomer, which comprises 35 to 65% by mole of vinylidene fluoride, 10 to 30% by mole of tetrafluoroethylene, 16 to 30% by mole of hexafluoropropylene and 0.5 to 5% by mole of 2H-pentafluoropropyleneand has a fluorine content of at least 68% by weight, the sum total being 100% by mole.

10. A fluorine-containing elastomer according to claim 7, wherein the elastomer has a ηsp/c value of at least 0.5, as measured as a 1.0 wt. % solution in methyl ethyl ketone at 35° C.

11. A fluorine-containing elastomer according to claim 7, wherein the elastomer has a ηsp/c value of 0.6 to 1.5, as measured as a 1.0 wt. % solution in methyl ethyl ketone at 35° C.

* * * * *

UNITED STATES PATENT AND TRADEMARK OFFICE
CERTIFICATE OF CORRECTION

PATENT NO. : 5,874,506
DATED : February 23, 1999
INVENTOR(S) : Haruyoshi Tatsu, Akihiro Naraki, and Yuichi Yamamoto It is certified that error appears in the above-identified patent and that said Letters Patent is hereby corrected as shown below:

Column 1, line 23, change "quater-nary" to read --quaternary--;

Column 2, line 53, change ".../cm$_2$" to read --cm$^2$--;

Column 4, line 15, change "C group" to --O group--;

Column 5, line 52, change "48.56%" to --48.6%--;

Column 7, line 29, change "g.mm/m2day" change -- g·mm/m$^2$day--;

Column 8, line 6, please indent the sentence beginning "The thus obtained..." so that this sentence begins a paragraph.

Signed and Sealed this

Second Day of January, 2001

*Attest:*

Q. TODD DICKINSON

*Attesting Officer*  *Commissioner of Patents and Trademarks*